United States Patent
Pepe et al.

(10) Patent No.: US 10,164,864 B2
(45) Date of Patent: Dec. 25, 2018

(54) NETWORK TOMOGRAPHY THROUGH SELECTION OF PROBING PATHS

(71) Applicant: Telefonaktiebolaget LM Ericsson (publ), Stockholm (SE)

(72) Inventors: Teresa Pepe, Pisa (IT); Marzio Puleri, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 106 days.

(21) Appl. No.: 15/304,957

(22) PCT Filed: Apr. 23, 2014

(86) PCT No.: PCT/EP2014/058212
§ 371 (c)(1),
(2) Date: Oct. 18, 2016

(87) PCT Pub. No.: WO2015/161872
PCT Pub. Date: Oct. 29, 2015

(65) Prior Publication Data
US 2017/0201450 A1  Jul. 13, 2017

(51) Int. Cl.
| H04L 12/28 | (2006.01) |
|---|---|
| H04L 12/751 | (2013.01) |
| H04L 12/24 | (2006.01) |
| H04L 12/26 | (2006.01) |
| H04L 12/721 | (2013.01) |

(52) U.S. Cl.
CPC .......... *H04L 45/02* (2013.01); *H04L 41/142* (2013.01); *H04L 43/10* (2013.01); *H04L 45/12* (2013.01); *H04L 45/123* (2013.01); *H04L 41/12* (2013.01)

(58) Field of Classification Search
CPC .............................. H04L 45/02; H04L 45/123
USPC ........................................................ 370/389
See application file for complete search history.

(56) References Cited

U.S. PATENT DOCUMENTS

| 6,785,240 B1 * | 8/2004 | Cao ...................... H04L 43/045 370/238 |
|---|---|---|
| 7,353,294 B1 * | 4/2008 | Nucci .................. H04L 41/142 370/238.1 |
| 9,614,735 B2 * | 4/2017 | Bisdikian .............. H04L 41/145 |
| 2009/0135727 A1 | 5/2009 | Agrawal et al. |
| 2014/0016469 A1 * | 1/2014 | Ho ......................... H04L 47/38 370/235 |

OTHER PUBLICATIONS

Ma et al; "Efficient Identification of Additive Link Metrics via Network Tomography"; 2013; IEEE; 581-590.*

(Continued)

*Primary Examiner* — Christopher R Crompton
(74) *Attorney, Agent, or Firm* — Baker Botts, LLP

(57) ABSTRACT

A method (50) of selecting a set of probing paths in a network for network tomography. The method comprises generating (52) possible probing paths ($P_1$). The method further comprises determining (53) if the possible probing paths are linearly independent from probing paths already selected for the set of probing paths, in an order of an increasing cost or distance of the possible probing paths. The method further comprises selecting (55) a said possible probing path for the set of probing paths only if the possible probing path is linearly independent from probing paths already selected.

15 Claims, 2 Drawing Sheets

(56) References Cited

OTHER PUBLICATIONS

Feng et al; "Impact of Node-selfishness on the Connectivity and Path Delay of Ad-hoc Networks"; 2012; IEEE; 66-70.*
Ren et al; "Solid End-to-end Probing and Analysis Method for Estimating Network Loss"; 2011; IEEE; 318-322.*
Ren et al; "Scalable Deterministic End-to-End Probing and Analytical Method for Overlay Network Monitoring"; 2011; IEEE.*
Gopalan et al; "On Identifying Additive Link Metrics Using Linearly Independent Cycles and Paths"; Jun. 2012; IEEE; 906-916.*
Thoppe, Gugan; "Generalized Network Tomography"; Oct. 5, 2012; IEEE; 762-769.*
Detecting Anomalies Using End-To-End Path Measurements by K.V.M. Naidu et al.—2008.
Minimizing Probing Cost and Achieving Identifiability in Network Link Monitoring by Qiang Zheng and Guohong Cao—2013.
Minimizing Probing Cost and Achieving Identifiability in Network Link Monitoring by Qiang Zheng and Guohong Cao; 2010 International Conference on Distributed Computing Systems—2010.
Minimizing Probing Cost and Achieving Identifiability in Probe-Based Network Link Monitoring by Qiang Zheng and Guohong Cao; IEEE Transactions on Computers, vol. 62, No. 3—Mar. 2013.
Network Tomography: Identifiability and Fourier Domain Estimation by Aiyou Chen, Jin Cao, Tian Bu—2007.
Topological Constraints on Identifying Additive Link Metrics Via End-To-End Paths Measurements by Liang Ma et al.—2012.
International Search Report for International application No. PCT/EP2014/058212—dated Dec. 22, 2014.

* cited by examiner (NETWORK)

NETWORK TOMOGRAPHY THROUGH SELECTION OF PROBING PATHS

PRIORITY

This nonprovisional application is a U.S. National Stage Filing under 35 U.S.C. § 371 of International Patent Application Serial No. PCT/EP2014/058212, filed Apr. 23, 2014, and entitled "Network Tomography Through Selection of Probing Paths."

TECHNICAL FIELD

Aspects of the invention relate to a method, system and computer program product for network tomography,

BACKGROUND

Recently, Network Tomography has emerged as a promising technique for network performance evaluation and diagnosis. Using Network Tomography it is possible to infer network performance from measurable metrics without cooperation between network elements.

However, this approach has a potential limitation related to the availability of monitoring connections. Network Tomography can work using both passive and active measurements. In the passive case the system can take advantage from connections already present in the network to obtain aggregate path-level information without affecting traffic load. However, the coverage provided by such connections may not span all the paths of interest. If the available connections are not sufficient to uniquely identify all link metrics from path measurements, active probing is required.

In this case, it is assumed that a set of boundary nodes is able to send probe packets to another set of edge nodes in order to measure packet attributes on the end-to-end path.

Finding all the monitoring paths required to infer information about the internal status of the network is known as the identifiability problem. An analysis of the topological conditions that ensure identifiability is provided in Zheng, Qiang, and Guohong Cao. "Minimizing probing cost and achieving identifiability in network link monitoring", Distributed Computing Systems (ICDCS), 2010 IEEE 30th International Conference on. IEEE, 2010, or in Ma, Liang, et al. "Topological constraints on identifying additive link metrics via end-to-end path measurements", IBM THOMAS J WATSON RESEARCH CENTER HAWTHORNE NY, 2012, or in Chen, Aiyou, Jin Cao, and Tian Bu. "Network tomography: Identifiability and Fourier domain estimation", Signal Processing, IEEE Transactions on 58.12 (2010): 6029-6039.

However, functions are not known for the selection of the right paths to efficiently and uniquely identify all link metrics from path measurements in general situations. This leads to substantial difficulties in the application of network tomography in the field, where networks can have any architecture.

SUMMARY

In a first aspect of the invention, there is provided a method of selecting a set of probing paths in a network for network tomography. The method comprises generating possible probing paths, and determining if the possible probing paths are linearly independent from probing paths already selected for the set of probing paths, in an order of an increasing cost or distance of the possible probing paths. The method further comprises selecting a said possible probing path for the set of probing paths only if the possible probing path is linearly independent from probing paths already selected.

Thus, a set of probing paths for network tomography is efficiently generated.

In a second aspect of the invention, there is provided a network tomography system configured to select a set of probing paths in a network for network tomography. The system comprises a processing unit configured to generate possible probing paths, the processing unit further configured to determine if the possible probing paths are linearly independent from probing paths already selected for the set of probing paths, in an order of an increasing cost or distance of the possible probing paths. The processing unit is further configured to select a said possible probing path for the set of probing paths only if the possible probing path is linearly independent from probing paths already selected.

According to another aspect of the present invention, there is provided a computer program product, configured when run on a computer to conduct a method according to any one of methods defined in the appended claims.

BRIEF DESCRIPTION OF THE DRAWINGS

Embodiments will now be described by way of example only in relation to the enclosed drawings, in which.

DETAILED DESCRIPTION

Aspects of the invention relate to a monitoring system using Network Tomography (NT) for remote fault and performance analysis. Network Tomography infers the network status using end-to-end probing connections following specific paths. The proper choice of a minimal set of probing paths providing a full coverage of the network is a main issue for the application of NT technology in the field. Examples of the present invention are configured to generate such a minimal set of probing paths providing a full coverage of the network.

Figure 1:
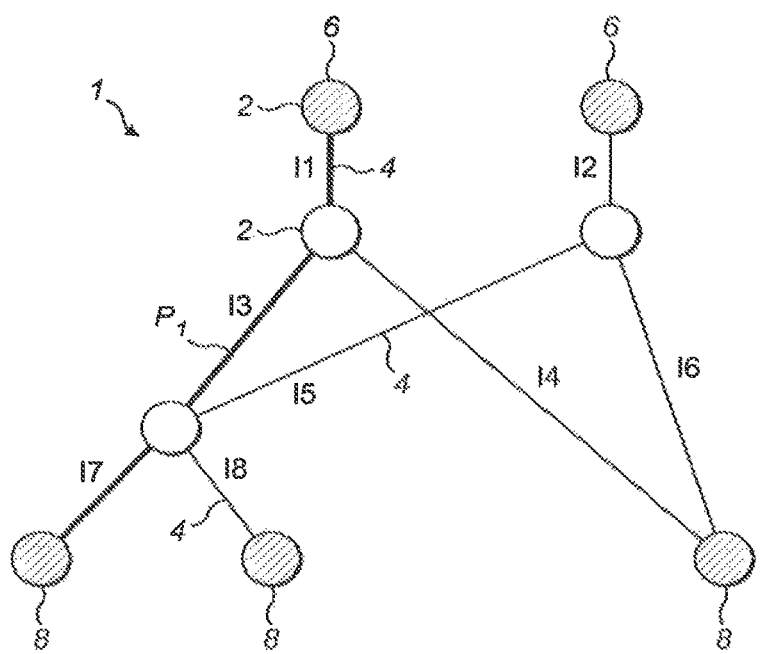
FIG. 1 is a schematic overview depicting a network for illustrating an example of the invention.

FIG. 1 is an example network 1 to which the method and system of examples of the present invention are applicable. The network 1 comprises a plurality of nodes 2, for example, routers. The nodes 2 are connected by communication links 4.

The network 1 comprises one or more edge nodes 6 (or end-systems), termed first edge nodes 6. The network further comprises one or more edge nodes 8 (or end-systems), termed second edge nodes 8.

In some example, the first or second edge nodes 6,8 of the network are nodes at the networks borders which a telecom operator has access to. The edge nodes used for network tomography may or may not include all of the edge nodes available. For example, an operator may decide to use only two nodes for monitoring, with all paths starting and ending into those two nodes. By increasing the number of edge nodes it is possible and easier to find a better coverage of the network.

A path $P_i$ may be defined as a sequence of links starting from a source host, e.g. any one of first edge nodes 6 and ending at a destination host, e.g. any one of second edge nodes 8. The paths are numbered with a number i, as paths $P_i$. In this example, there are six paths $P_1$ to $P_6$. In some examples, the network comprises more than two sets of edge nodes, i.e. more than two sets of end-systems. In some aspects, the set of probing paths may be between any two of the sets of end-systems, for each combination connecting the sets end-systems.

The path $P_i$ connecting two end-systems 6,8 and carrying a probe packet may be termed a probing path. All the probing paths in the network 1 form the path set P. Typically, a probing path follows the routing path imposed by the network. In some examples of the invention, the path through which to send probe packets may be selected. For example, the path may be selected in a MPLS network. This allows optimizing the monitoring coverage of the network.

Table 1 shows six example paths $P_i$ in the network 1. Path $P_1$ is illustrated in FIG. 1. The links 4 defining each path are listed. The links 4 are numbered with a number j, as links $l_j$. In this example, there are eight links $l_1$ to $l_8$.

TABLE 1

| Path $P_i$ | Links used |
|---|---|
| $P_1$ | $l_1, l_3, l_7$ |
| $P_2$ | $l_1, l_3, l_8$ |
| $P_3$ | $l_1, l_4$ |
| $P_4$ | $l_2, l_5, l_8$ |
| $P_5$ | $l_2, l_5, l_8$ |
| $P_6$ | $l_2, l_6$ |

FIG. 1 illustrates a digraph represented as G=(V, E) where V is a set whose elements are called vertices or nodes 2 and E is a set of direct edges (i.e., communication links 4 between nodes). A plurality of end-systems 6,8 are connected to (or part of) the network 1 and they can send and receive probe packets.

For a given network G=(V, E) and a probing path set P, a dependency matrix A [M×N] may be defined. Each row of A represents a probing path in the network (M is the number of paths $P_i$). Each column of A represents a link l (N is the number of links 4). For each element i,j of the matrix A:

$$A_{ij} = \begin{cases} 1 & \text{if path } P_i \text{ traverses link } l_j \\ 0 & \text{otherwise} \end{cases}$$

For example, the dependency matrix A related to the network of FIG. 1 and Table 1 is:

$$A = \begin{pmatrix} 1 & 0 & 1 & 0 & 0 & 0 & 1 & 0 \\ 1 & 0 & 1 & 0 & 0 & 0 & 0 & 1 \\ 1 & 0 & 0 & 1 & 0 & 0 & 0 & 0 \\ 0 & 1 & 0 & 0 & 1 & 0 & 1 & 0 \\ 0 & 1 & 0 & 0 & 1 & 0 & 0 & 1 \\ 0 & 1 & 0 & 0 & 0 & 1 & 0 & 0 \end{pmatrix}$$

The network 1 is considered identifiable in network tomography if the current set of connections provides the needed network monitoring coverage to allow a proper analysis of the network. In some aspects, if the performance of the links can be uniquely inferred from a set of end-to-end probes, the network is termed identifiable; otherwise, it is termed unidentifiable. The identifiability of a network depends on which probing paths P are selected.

In more detail, identifiability can be considered as analyzing the routing matrix to select a set of rows, equal to the number of the parameters to be detected, that provide a full rank dependency matrix.

Examples of the invention provide a new functionality to select the right probing paths to achieve the identifiability of the network. This provides for a feasible utilization of network tomography to infer network performance.

For a network G and a set of monitored links, aspects of the invention to select the set of probing paths that solve the identifiability problem, such that the performance of each monitored link can be uniquely inferred. Aspects of the invention provide an algorithm for the solution of the identifiability problem.

For additive metrics, the relation between probing paths and links 4 may be modeled as a system of linear equations. The unknown variables are link metrics, and known constants are the end-to-end path measurements. The end-to-end path measurements Y are considered equal to the sum of link metrics X corresponding to that path.

Given the dependency matrix A described above:

$$Y = AX$$

The ith linear equation is the following:

$$y_i = \sum_{j=1}^{M} a_{ij} x_j$$

The variable $x_j$ denotes the performance of the link $l_j$ and the variable $y_i$ is the performance of the probing path $p_i$. The value of $a_{ij}$ of the dependency matrix A is 1 if the probing path $p_i$ traverses the link $l_j$; 0 otherwise.

Aspects of the invention relate to a solution to the identifiability problem, e.g. uniquely determining X, i.e. the metric of each link. A network is determined to be identifiable if it is verified that the linear system Y=AX is solvable. Given the above linear system, the network G is identifiable if A has full column rank, i.e., rank (A)=M.

Aspects of the invention relate to analyzing the routing matrix to select a set of rows that provide a full rank dependency matrix. Examples of the invention add probing connections to obtain a full rank matrix. Examples of the invention determine the set of probing paths that uniquely determine an identifiable network, i.e. that solves (identifies) the variable x determining the performance of each link.

Aspects of the invention provide a solution to provide network identifiability with a method and system for determining a set of probing paths that can uniquely determine the internal status of the network. Different probing paths can have different contributions to determining the status of a link. Aspects of the invention are configured to find a full rank dependency matrix A, in order to solve the identifiability problem.

In examples of the invention, active probing is used to set up all the probing connections needed, independently from the native routing matrix. In some examples, the selected probing paths are on a connection orientated network. Aspects of the invention apply to networks where paths are selected by a network management (e.g. MPLS, GMPLS).

Aspects of the invention may be configured to select probing paths in the network until the internal status of the network can be uniquely determined. The method of determining such probing paths may be referred to as a path selection algorithm. An example of the method finds the minimum number of paths so as to have a full rank dependency matrix.

In a step of the algorithm of the present invention, a search is made for possible probing paths in the network. The probing paths are between any two of the edge nodes from different sets of edge nodes, e.g. edge nodes 6,8.

In some examples, an efficient search of possible probing paths comprises considering the possible paths in order of distance or cost. Any parameter may be selected as a measure of distance or cost. For example, the paths are considered in order of increasing distance or cost, starting with the smallest distance or cost. In this example, the shortest path is considered first. The next shortest path is considered next. As such, the possible probing paths are sorted according to distance, and considered in order, starting with the path with the smallest distance. The method uses an algorithm for calculating possible paths between two end-systems, which are ordered by cost or distance.

For example, the paths are sorted on the basis of distance, e.g. hop count. In further examples, the probing paths may be ordered by cost, e.g. any criteria associated with each link as a cost (e.g., economic cost, bandwidth). The shortest path in this case is the one with the smallest cost. In general, probing paths are sorted by cost; and the distance is a particular example of cost (e.g. cost per link=1).

In one example of the invention, the method uses an algorithm for the computation of the K-shortest path. In some examples, the K-shortest paths are calculated using Yen's algorithm. Alternatively, any other K-shortest path algorithm may be used. Using this type of algorithm, the shortest path, and K−1 other paths are found, ordered by increasing cost (e.g. distance).

However, the usage of such an algorithm alone is not sufficient to solve the network identifiability problem, as described above.

Probing paths are generated and analysed for linear independence until a sufficient number have been found to determine the status of each link in the network. For a K shortest path algorithm, K is set as N, i.e. the number of links of the network. This relies on the understanding that the link metrics can be uniquely identified if the number of linearly independent paths is equal to the number of links in the network. Aspects of the invention find a number of linearly independent equations equal to the number of the parameters to be detected so as to solve the identifiability problem.

In a step of a method, the linear independence of each of the possible paths is determined against those paths already selected as probing paths. Only the paths that allow adding a linearly independent equation to the system are themselves selected as probing paths.

The check of linear independence is of a possible path being considered against only those paths which are already selected as linearly independent. The check of linear independence is made for each possible path against those selected paths which were previously generated in order of increasing cost or distance. Alternatively, the check is against all generated paths which are shorter or have lower cost. This minimizes the number of employed, selected, probing paths.

For example, the K-shortest path algorithm is modified to evaluate a new (i.e. next) shortest path and verify that it is linearly independent from the other probing paths already selected as linearly independent probing paths. Further paths are identified and evaluated until a full rank dependency matrix is constructed, i.e. until the network is identifiable. K is decremented only if the path is verified to be independent, selected and stored. Thus, the algorithm continues to calculate paths until N independent probing paths are found.

The verification of linear independence may be implemented by any suitable algorithm. For example, the Gauss reduction method may be used. The verification of linear independence is based on the knowledge of network topology; the sending of probing packets is not required to verify linear independence.

Thus, the set of equations identifying the network is determined by the set of independent paths found using the K-shortest paths algorithm combined with an algorithm for the verification of the linear independence.

Aspects of the invention relate to a system or module that implements an automatic functionality to determine a full monitoring coverage of an arbitrary network, while simultaneously minimizing the overhead due to the transmission of probing packets. The system is configured to implement a method to determine the N distinct probing paths. The distinct probing paths are strictly necessary to uniquely determine the internal status of the network. This is since each path provides a constraint linear equation, linear algebra theory indicates that the link metrics can be uniquely identified if the number of linearly independent paths is equal to the number of links in the network. Thus, N must be equal to the number of links of the network. Aspects of the invention relate to determining N distinct probing paths, with N being equal to the number of links of the network.

Examples of the present invention are based on the use of a K-shortest path algorithm that generates not only find the shortest path, but also K−1 other paths, ordered by increasing cost. A further step automatically verifies the independence of the paths. In some examples, this verification of independence is carried out directly when the possible probing paths are returned by the path generation algorithm, e.g., K-shortest path algorithm.

Examples of the method verify the independence of the last returned possible probing path with respect to the previously computed paths. In a case that the probing path being analysed for independence is found to be independent, it is selected as a probing path. Otherwise, that probing path is discarded and not utilized. In such a way, a set of probing paths for network tomography is efficiently and automatically selected. In particular, all the paths that are required for a full coverage of the network are selected, while simultaneously minimizing the number of selected paths. This is because those paths that are not strictly necessary are automatically discarded, thus reducing the probing traffic.

The algorithm according to examples of the invention continues identifying paths and verifying linear independence until a number of linearly independent probing (measurement) paths is equal to the number of links. With this number, the link metrics are considered to be uniquely identifiable. Aspects of the invention relate to using the set of probing paths to determine the link metrics, for example, for each link in the network. The number of possible probing paths generated and considered will depend on how many possible paths are discarded for not being linearly independent.

Examples of the invention may be a method, apparatus or computer program code for path selection. An example of pseudocode for illustrating the features of the invention is below. This code is merely intended to describe an example of the invention, and is not intended as the actual code. Examples of the invention include a computer program or computer program product configured, when run on a computer or processing unit, to carry out the method of any embodiment.

Input: G=(V, E), where V is a set of vertices or nodes (e.g., routers) and E is a set of direct edges (i.e., communication links between nodes).
P: list of probing path

```
0.    Initialize K=E, j=1
1.    while (j < K )
2.        find the jth shortest path
3.        if (p_j is linearly independent from [p_1, p_2, ..., p_{j-1}] then
4.            add p_j to P
5.            j=j+1
6.        else
7.            discard the path
8.        endif
9.    endwhile
```

In this example, the linear independence of each possible probing path is determined prior to generation of a further possible probing path. In some aspects, the method comprises generating only one possible probing path, determining the linear independence of said possible probing path, and then generating a further possible probing path.

Network identifiability uses a K-shortest path to determine the probing paths and the Gauss or similar method to identify the independent paths. The network shown in FIG. 1 is only an example, and aspects of the invention are applicable to much larger networks, e.g. hundreds, thousands or tens of thousands of nodes. The calculation time for determining the probing paths in an example of the invention is dependent on the size of the network.

The K-shortest path algorithm has a complexity of $O(K*(E+V*\log V))$ operations. As described above, K is the number of shortest paths to find, E is the number of edges and V is the number of vertices of the network. The Gauss reduction method for determining linear independence has a complexity of $O(N^3)$ operations with N the number of paths required.

The complexity of the overall algorithm is $O(m [K(E+V*\log V)+N^3])$ floating point operations. In this equation, m is the number of repetitions of Yen and Gauss algorithms to find the complete set of equations. Since N=E and K=N, formula becomes $O(m [E(E+V*\log V)+E^3])$. An example of the invention comprises a processor or processing unit configured to run this algorithm. The capacity of the processor in FLOPS determines the time needed for the system to identify the set of probing paths.

Figure 2:
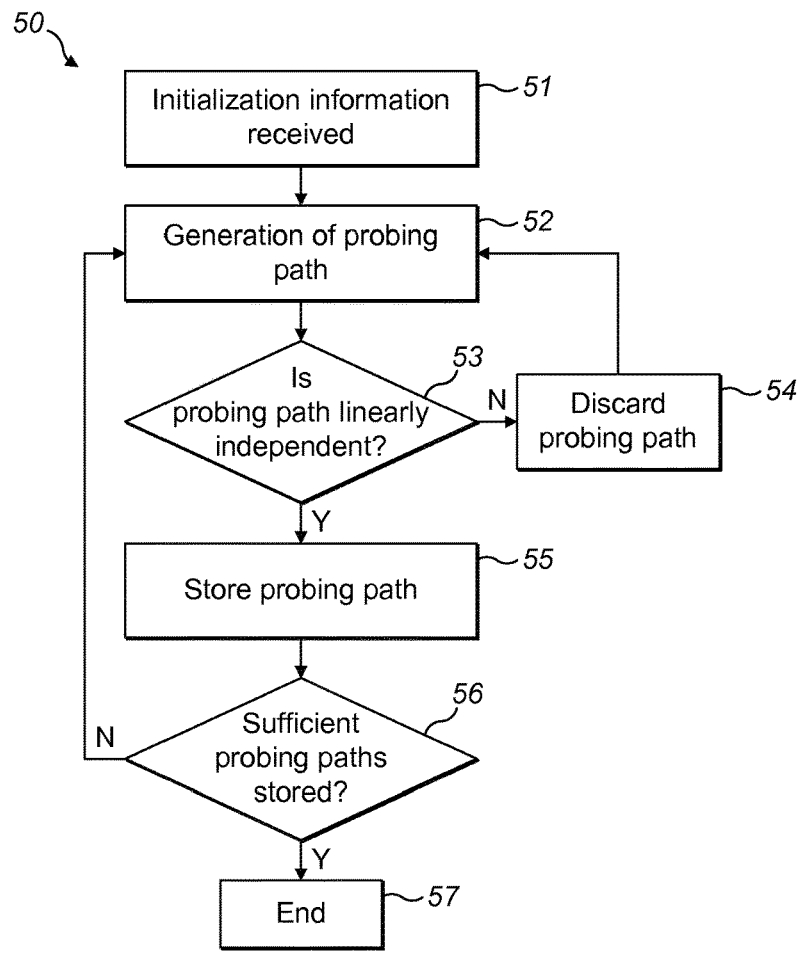
FIG. 2 is a schematic flowchart depicting a method according to an example of the invention.

FIG. 2 shows a flowchart 50 illustrating a method according to an example of the invention. In 51, initialization information is received. For example, the network topology is input. In some examples, the number of links in the network is provided or derived.

In 52, a possible probing path is generated. For example, the probing path is a shortest probing path which has not yet been considered by the method. As such, the shortest probing path between the defined edge nodes 6,8 is generated initially. A next shortest path is generated in a next iteration of the method. The next shortest path may be generated by a K-shortest path algorithm.

In 53, a determination of the linear independence of the generated probing path is made. The linear independence is checked against the (shorter) probing path(s). In some aspects, the linear independence of the considered possible probing path is checked against all those previously generated, and selected as independent (i.e. stored) probing paths, e.g. having lower distance or cost.

In 54, the considered probing path is determined to not be linearly independent to at least one of the probing paths. In this case, the considered probing path is not necessary. The considered probing path is therefore discarded, and not stored with the selected probing paths. The next shortest probing path is then considered in step 52.

In 55, the considered probing path is determined to be linearly independent to all of the probing paths already considered. The currently considered probing path is therefore of value, and is also selected and stored. The next shortest path is then considered in step 52.

In 56, it is determined whether a sufficient number of linearly independent probing paths has been selected and stored. In particular, the sufficient number of probing paths is the number N of links in the network. If more probing paths are needed, the method iterates, and a further probing path is generated in step 52.

When the number of selected independent probing paths reaches N, the method of selecting the probing paths ends 57. In some examples, the set of selected probing paths is then used to determine the status or information about the network, e.g. by transmitting or monitoring packets on those probing paths.

Figure 3:
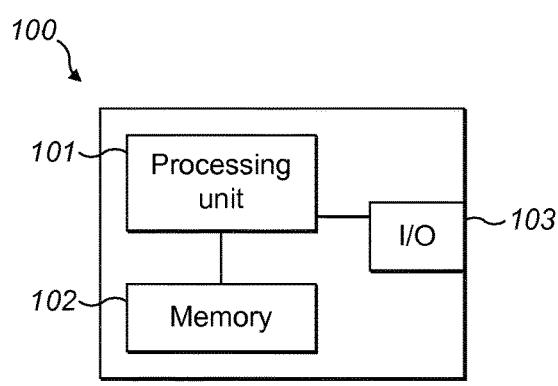
FIG. 3 is a block diagram depicting a system according to an example of the invention.

FIG. 3 shows a network tomography system 100 or module, as an example of the invention. In some examples, the network tomography system 100 receives information regarding topology and edge nodes, e.g. in file form. The network tomography system 100 is configured to determine the set of probing paths, as described. In some examples, the network tomography system 100 is configured to send probing packets and make measurements of the network based on the packets sent. In some examples, the network tomography system 100 is configured to analyse the measurements in an example of network tomography.

The generation of the set of probing paths may be carried out without additional input or action from an operator of the network tomography system 100. The probing paths are computed automatically, e.g. initiated by a "push-button" operation. The results of the generated paths may be reported in graphical and/or text form. The network tomography system 100 may operate by itself, or operate in combination with another system, e.g. a centralized remote Operations, Administration and Management (OAM) system implementing OAM functionalities.

The network tomography system 100 comprises a processing unit 101 and a memory 102. The processing unit 101 and memory are configured to execute the algorithm described. The set of linearly independent probing paths are stored in the memory 102. An I/O device 103 provides for receiving of network information (e.g. topology and edge nodes) and/or transmission of the set of determined probing paths for generating such probing packets. In some examples, probing packets are received by the I/O device 103. In some aspects, measurements or calculations of link status or parameters are carried out by the network tomography system 100, e.g. in the processing unit 101.

The described functions and modules may be embodied in the processing unit 101, for example, a processing unit running a computer program. Examples of the invention comprise a computer program, or computer program product, configured to implement the method of any embodiment of the invention.

Aspects of the invention allow implementing centralized remote OAM functionalities, based on end-to-end packet or traffic measurements only. Aspects of the invention provide an automatic technique to find the minimal set of probing paths needed to provide a full coverage of generic networks, e.g. heterogeneous networks.

The automatic generating of the probing paths in a generic network allows the application of NT in the field. Aspects of the invention provide a robust and efficient method for the definition of a set of probing paths providing the best network coverage. A NT device according to an example of the invention has an automatic functionality to select the right probing paths to achieve the identifiability of the network. This functionality is an enabler for a practical use of network tomography in the field.

Aspects of the invention compute all the paths required to infer network performance, independently of whether active probing or passive probing is to be used in the later probing phase. For active probing, the selected set of probing paths used. If passive probing is used, and it is not the case that all the paths selected by the algorithm are available connections; then in this case it is necessary to send active probing.

In an alternative example, one or more probing paths are generated prior to being checked for linear independence. In some aspects, a plurality of possible probing paths are generated, and then the plurality of probing paths are each checked for linear independence. In some examples, the number of possible probing paths generated may be sufficient for identifiability of all the links, with the checking of the linear independence of the possible probing paths starting only after generation of some or all the possible probing paths.

Any example described may be used in combination with any example or embodiment described.

The invention claimed is:

1. A method of selecting a set of probing paths in a network for network tomography, the method comprising:
   generating possible probing paths,
   determining if the possible probing paths are linearly independent from probing paths already selected for the set of probing paths, in an order of an increasing cost or distance of the possible probing paths,
   selecting a said possible probing path for the set of probing paths only if the possible probing path is linearly independent from probing paths already selected.

2. The method as claimed in claim 1 wherein the generating the possible probing paths comprises generating the possible probing paths in an order of an increasing cost or distance of the possible probing paths.

3. The method as claimed in claim 1 wherein the linear independence of each possible probing path is determined prior to generation of a further possible probing path.

4. The method as claimed in claim 1 wherein the method ends when the number of selected probing paths in the set of probing paths is determined to be equal to a number of links in the network.

5. The method as claimed in claim 1 wherein generating a probing path comprises generating a probing path using a K-shortest path algorithm.

6. The method as claimed in claim 1 wherein the probing paths are between edge nodes of the network.

7. The method as claimed in claim 1 wherein one or more packet is sent on each of the set of probing paths and/or monitoring one or more packet sent on each of the set of probing paths.

8. A network tomography system configured to select a set of probing paths in a network for network tomography, the system comprising:
   a processor configured to generate possible probing paths,
   the processor further configured to determine if the possible probing paths are linearly independent from probing paths already selected for the set of probing paths, in an order of an increasing cost or distance of the possible probing paths, and
   the processor further configured to select a said possible probing path for the set of probing paths only if the possible probing path is linearly independent from probing paths already selected.

9. The system as claimed in claim 8 wherein the processor is configured to generate the possible probing paths in an order of an increasing cost or distance of the possible probing paths.

10. The system as claimed in claim 8 wherein the processor is configured to determine the linear independence of each possible probing path prior to generation of a further possible probing path.

11. The system as claimed in claim 8 wherein the processor is configured to end selection for the set of probing paths when the number of selected probing paths in the set of probing paths is equal to a number of links in the network.

12. The system as claimed in claim 8 wherein the processor is configured to generate the probing paths using a K-shortest path algorithm.

13. The system as claimed in claim 8 wherein the processor is configured to select probing paths between edge nodes of the network.

14. The system as claimed in claim 8 wherein the system is configured to send one or more packet on each of the set of probing paths and/or the system is configured to monitor one or more packet sent on each of the set of probing paths.

15. A non-transitory computer readable medium comprising instructions to conduct the method according to claim 1.

* * * * *